Aug. 30, 1938.   R. VOGT   2,128,627
FAUCET
Filed May 18, 1937
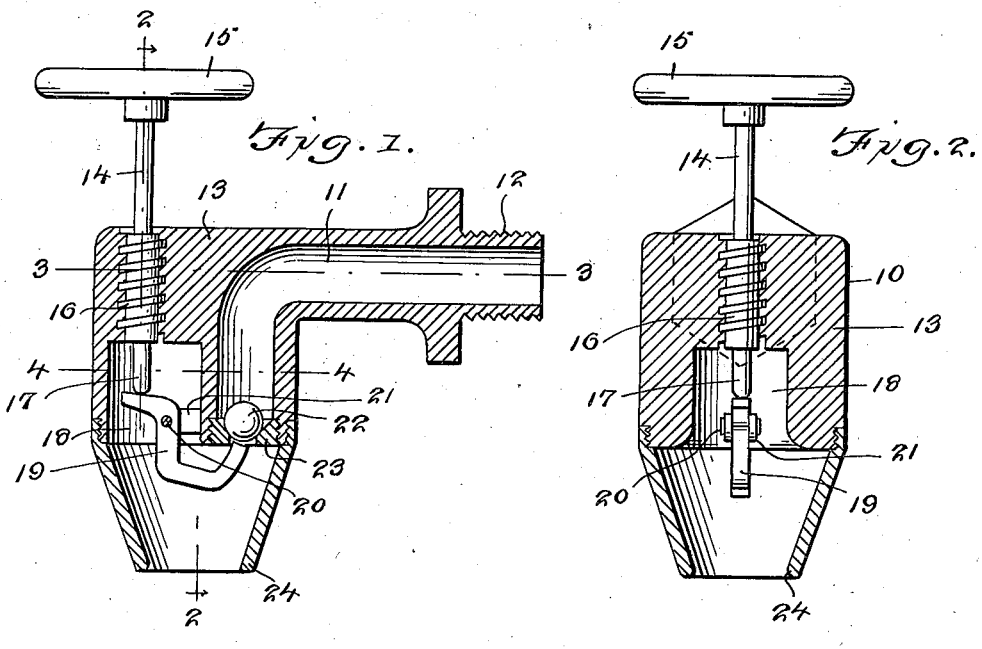
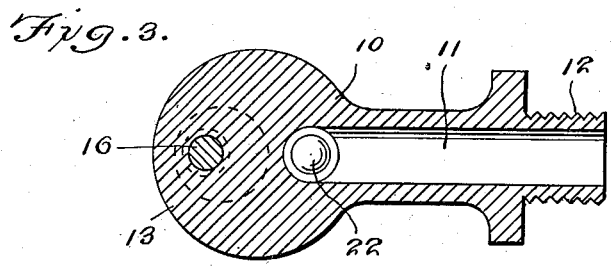
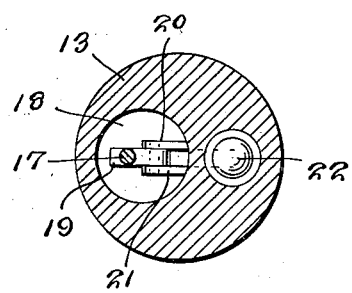
Robert Vogt
INVENTOR
BY *Victor J. Evans & Co.*
ATTORNEYS Patented Aug. 30, 1938

2,128,627

UNITED STATES PATENT OFFICE 2,128,627

FAUCET

Robert Vogt, Geneva, Ill.

Application May 18, 1937, Serial No. 143,382

1 Claim. (Cl. 251—133)

The object of the invention is to provide a faucet of improved construction so that over a long period of time no necessity for replacement of parts to prevent leakage will be necessary; to provide a faucet which has all the advantages of the compression cock without the necessity for rewashering, as in the latter, and generally to provide a faucet which is of simple form and susceptible of comparatively cheap manufacture.

With this object in view, the invention consists in a construction and combination of parts of which a preferred embodiment is illustrated in the accompanying drawing but to which the invention is not to be restricted. Practical application may dictate certain changes or alterations and the right is claimed to make any which fall within the spirit of the invention.

Figure 1 is a central vertical sectional view through the invention.

Figures 2, 3 and 4 are sectional views on the planes indicated by the lines 2—2, 3—3 and 4—4 respectively of Figure 1.

The body portion 10 of the improved faucet is generally like those in conventional use, being provided with a water channel 11 and the lateral portion 12 for attachment to a water supply pipe. At the outer end, however, the body portion is enlarged to provide a head section 13 in which is mounted the valve operating stem 14 which may be provided either with a T head or with a hand wheel 15 as shown. The stem 14 is threaded, as indicated at 16, this threaded portion engaging internal threads in the head. But beyond the threaded portion, the stem 14 has a pilot element 17 disposed within a chamber 18 in the head, this pilot portion being for the purpose of engaging the ball valve unseating lever 19 which is pivotedly mounted at 20 between ears 21 of generally angular form but the resistance arm is of hook shape with the free extremity disposed directly below the ball valve 22, so that if the force arm is depressed, the resistance arm will be raised and with it the ball valve 22. Normally the ball valve is engaged with its seat which is in the form of a movable ring 23 threaded in the body portion 10 at the discharge end of the water channel 11.

A nozzle member 24 is threadingly engaged with the head 13 and is of progressively reduced diameter, so as to direct the water in a stream after it is discharged from the channel 11 when the ball valve is raised.

Obviously the rotation of the stem in one direction will function to unseat the ball valve, while rotation in the other direction will allow the valve to be seated by the water pressure behind it.

The invention having been described, what is claimed as new and useful is:

A faucet comprising a head section and an integrally connected leg section formed with a water channel communicating with the head section of which the latter is provided with a pendent nozzle member and a chamber disposed laterally of that portion of the water channel in the head, a valve seat carried in the head at the point where the water channel communicates with the nozzle member, a ball engaging said seat, a lever having a pivotal mounting in said chamber slightly above the plane of said seat and having its resistance arm extended to provide a ball engaging terminal, and an axially movable stem threadedly mounted in said head and with a pilot element disposed within said chamber, the lever having its force arm disposed in the path of movement of said pilot, so that upon axial movement of the stem, the lever is rocked to elevate the ball from its seat.

ROBERT VOGT.